United States Patent [19]

Suzuki et al.

[11] Patent Number: 5,194,179
[45] Date of Patent: Mar. 16, 1993

[54] LIQUID CRYSTAL COMPOUNDS

[75] Inventors: Yoshiichi Suzuki; Ichiro Kawamura; Hiroyuki Mogamiya, all of Tokyo, Japan

[73] Assignee: Showa Shell Sekiyu K.K., Tokyo, Japan

[21] Appl. No.: 316,195

[22] Filed: Feb. 27, 1989

[30] Foreign Application Priority Data

Feb. 26, 1988 [JP] Japan .................................. 63-42215

[51] Int. Cl.$^5$ ...................... C09K 19/12; C09K 19/06; C09K 19/52
[52] U.S. Cl. ........................... 252/299.66; 252/299.01; 252/299.6
[58] Field of Search ....................... 252/299.62, 299.63, 252/299.65, 299.66, 299.67; 560/64, 65, 60; 568/681, 634, 639

[56] References Cited

U.S. PATENT DOCUMENTS 4,613,209 9/1986 Goodby et al. .................. 350/350 S
4,668,427 5/1987 Saito et al. ....................... 252/299.66

FOREIGN PATENT DOCUMENTS 63-307837 12/1988 Japan .
1-139551 6/1989 Japan .
87/07890 12/1987 World Int. Prop. O. .
88/08441 11/1988 World Int. Prop. O. ...... 252/299.01

OTHER PUBLICATIONS

University of Tohoku, *The 14th Liquid Crystal Forum Preprint*, Sep. 27-29 (w/translation).
Chemistry Express, vol. 2, No. 1, pp. 53-56, Kinki Chemical Society, JP; K. Yoshino et al Fluorinated Ferroelectric Liquid Crystal and Its Dielectric Property.
Japanese Journal of Applied Phsyics/Pt. 2: Letters, vol. 26, No. 2, Feb. 1987, pp. L77-K78, Tokyo, JP; K. Yoshino et al: Novel Ferroelectricity in Fluorinated Ferroelectric Liquid Crystal.

*Primary Examiner*—Robert L. Stoll
*Assistant Examiner*—C. Harris
*Attorney, Agent, or Firm*—Sughrue, Mion, Zinn, Macpeak & Seas

[57] ABSTRACT

The invention lies particularly in novel compounds represented by the general formula;

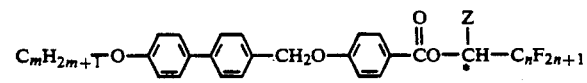

in which Z means $CF_3$, $CHF_2$, $CH_2F$, $CClF_2$, $CCl_2F$, $CHClF$, $CCl_3$, $C_2F_2$ or a perfluoroalkyl group of 3 or more carbon atoms, m and n are same or different with each other and represent an integral of 1-20, which are ferroelectric and chiral smetic liquid crystals of a large spontaneous polarization, a high speed of response and a good orientation, and showing a liquid crystal phase of tristable state and an electoclinic effect to be used as a liquid crystal element superior in an image display response.

5 Claims, 2 Drawing Sheets

LIQUID CRYSTAL COMPOUNDS

BACKGROUND OF THE INVENTION AND RELATED ART

The invention relates to novel liquid crystal compounds and more particularly to novel ferroelectric chiral smectic liquid crystals, which may be used as a display element material excellent in an image display response.

Liquid crystal display elements have been practically widely used in twisted nematic (TN) mode, guest-host (GH) mode and so on owing to the excellent properties thereof such as low voltage actuatability, low electric energy consumption, displayability in a thin structure and low eyestrain.

The liquid crystal display elements of nematic type, however, are disadvantageous in the slow speed of response in the order of several m sec - several tens of m sec, so that there are considerable limitations in the applied uses thereof.

In order to solve the problem referred to above, a satelite tracking network (STN) mode has been developed but it is still unsatisfactory in that it is necessary to precisely control of the cell gap and the tilt angle and in that the time of response is still low despite of that display properties such as display contrast and visual field angle have been considerably improved.

In order to comply with demands for novel liquid crystal displays superior in the time of response, ferroelectric liquid crystals have been provided for developing the liquid crystal devices having the far higher optical response time in the order of sec.

In the year of 1975, p-decyloxybenzylidene-p-amino-2-methylbutylcinamate (DOBAMBC) was synthesized as the ferroelectric liquid crystal by Meyer et al., and in the year of 1980 the high speed switching and memory properties of DOBAMBC were confirmed by Clark and Logawall [N. A. Clark et a., Appl. Phys. Lett. 36, 899 (1980)] so as to attract attention as an epoch-making liquid crystal element material capable of realizing the moving image display of a large picture in the simple matrix mode.

The molecular structure of the ferroelectric liquid crystals is characterized by comprising at least one assymetric carbon atom in the molecule thereof, having a large dipole moment and showing the smectic phase so that the apsis line of the molecule is tilted to the phase normal line by a some angle (tilt angle). When optically active compounds each having an optically active radical in the side chain fulfill these conditions, ferroelectricity and spontaneous polarization can be brought.

The spontaneous polarization and the speed of response of the ferroelectric liquid crystals are in the relation represented by $$\tau = \frac{\eta}{P_s \cdot E}$$

in which response speed, Ps; spontaneous polarization, E; impressed voltage and $\eta$; rotation viscosity [M. A. Handschy, Appl. Phys. Lett, 41, 39 (1982)]. In order to realize the high speed of response, thus, it is necessary to develop compounds of a larger spontaneous polarization and a lower viscosity as far as possible.

As for the molecule design for causing a large spontaneous polarization, it has been proposed to suppress the free rotation of the liquid crystal molecule about the apsis line, arrange the assymetric carbon atom part and the dipole moment carrying group to be as close as possible with each other and introducing a group having a larger dipole moment directly in the asymetric carbon part.

Meanwhile, there are various problems to be dissolved for the practically usable ferroelectric liquid crystal display element e.g. in that it is difficult to attain unified orientation of the liquid crystal molecules, that a high degree of technique is necessary in order to control unified cell gaps in the order of 1-2 $\mu$m and that the threshhold and hysteresis properties in the low-frequency range are not definite so that realization of the large picture and large capacity of display has been thought not to be so easy.

SUMMARY OF THE INVENTION

It is an object of the invention, thus, to find and provide novel liquid crystal compounds of a good physico-chemical stability, a large spontaneous polarization and a high speed of response by introducing an atomic or molecular group of a large electronegativity directly in the asymetric carbon atom part so as to increase the molecular dipole moment and by increasing the interaction between the asymetric carbon atom part and the polar group near thereto.

The other objects of the invention and other advantages attained thereby will be appreciated by those skilled in the art when studying the description of the preferred embodiments of the invention to be given hereafter.

Said objects can be attained fundamentally by the novel liquid crystal compounds having a benzylphenyl structure and represented by the general formula, R-(A)-X-(B)-Y-R* in which R means an alkyl or alkoxy group of 1-20 carbon atoms, R* means an optically active radical having an assymetrical carbon atom, X means

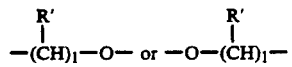

(1 is an integer of 1-3 and R' means hydrogen or a lower alkyl group), Y means —COO— or —O—, (A) and (B) respectively mean

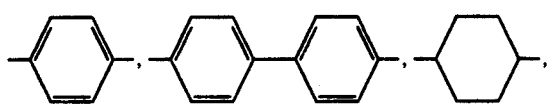

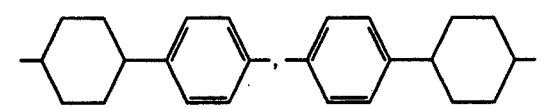

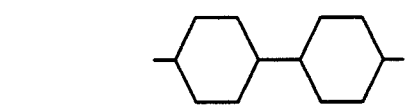

and when (A) means

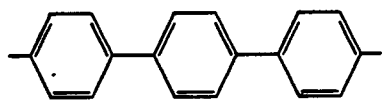

(B) and X respectively mean a single bond.

The liquid crystal compounds of the invention may show the tristable phase quite different from the conventional bistable phase in the molecular orientation as reported by the inventors [A. D. L. Chandani, T. Hagiwara, Y. Suzuki et al., Japan J. or Appl. Phys., 211 (5), L729-L732 (1988)] and maxe the optical response of definite threshhold property and hysteresis property relative to the driving voltage, to impressed voltage.

DESCRIPTION OF PREFERRED EMBODIMENTS OF THE INVENTION

Figure 1:
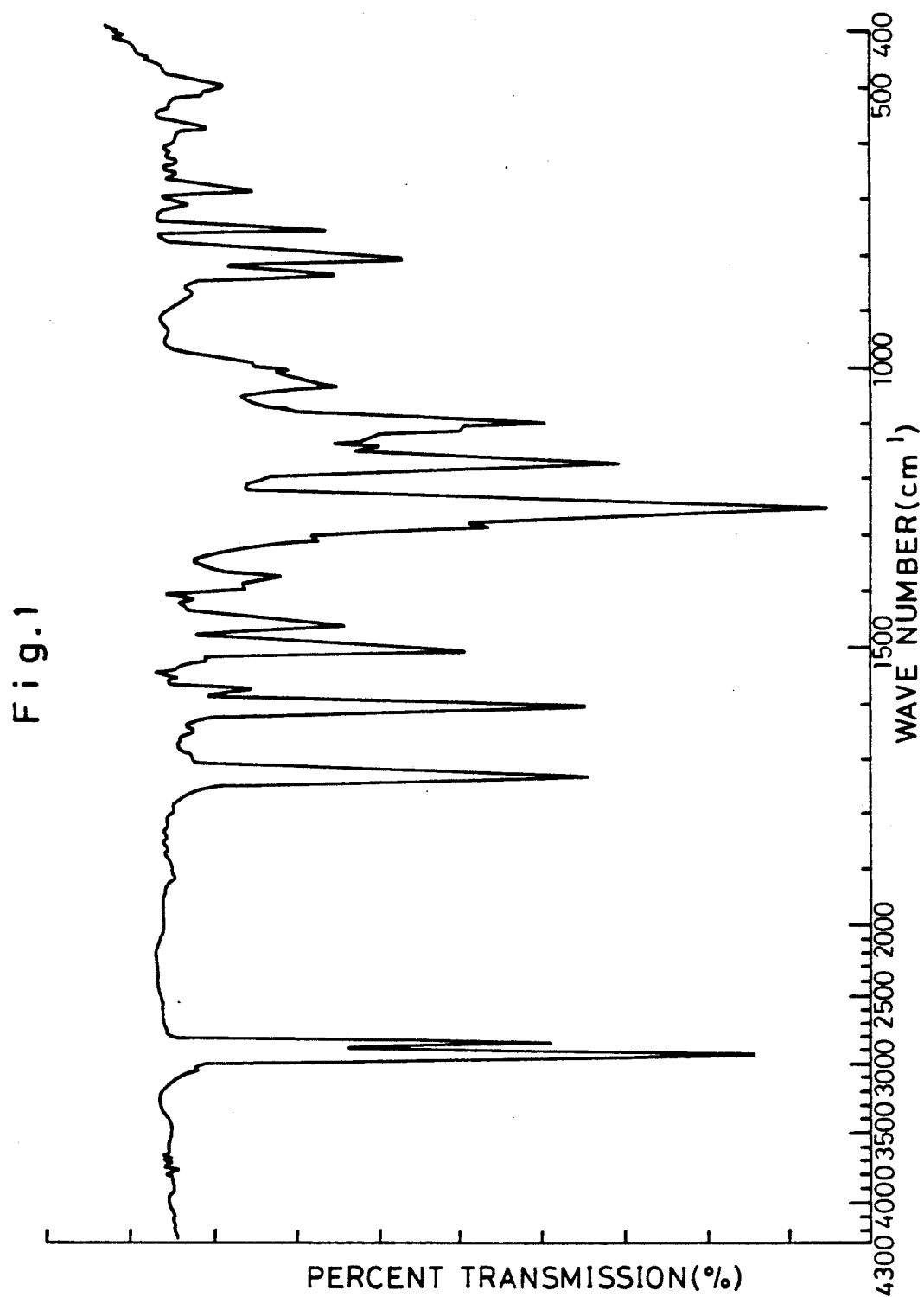
FIG. 1 shows an infrared absorption spectrum of (+)-1,1,1-trifluoro-2-decyl-4-(4'-octylbiphenyl-4''-methyleneoxy) benzoate, one of the objective liquid crystal compounds of the invention.

In the general formula, R-(A)-X-(B)-Y-R* representing the objective liquid crystal compounds according to the invention, R* may be represented more definitely by

in which Z means $CH_2F$, $CHF_2$, $CF_3$, $C_2F_5$, $CCl_3$, $CClF_2$, $CC_2F$, $CHFCl$ or a perfluoroalkyl group of 3 or more carbon atoms, and R'' means an alkyl, arlakyl, alkenyl, alkynyl, cycloalkyl, benzyl or phenethyl group of 1-20 carbon atoms.

The radical may be derived from any of the following alcohols.

1,1,1-trifluoro-2-$C_6$-$C_{16}$ alkanol,
1,1-difluoro-2-$C_6$-$C_{16}$ alkanol,
1-monofluoro-2-$C_6$-$C_{16}$ alkanol,
1,1,1,2,2-pentafluoro-2-$C_6$-$C_{16}$ alkanol,
1-monofluoro-1,1-dichloro-2-$C_6$-$C_{16}$ alkanol,
1,1,1-trichloro-2-$C_6$-$C_{16}$ alkanol,
1,1-difluoro-1-monochloro-2-$C_6$-$C_{16}$ alkanol,
1,1,1-trifluoro-1-phenylmethanol,
1,1,1-trifluoro-2-phenylethanol,
1,1,1-trifluoro-3-phenylpropanol,
1,1,1-trifluoro-3-decene-2-al and
1,1,1-trifluoro-3-heptyne-2-al.

Typical liquid crystal compounds of the invention of the general formula referred to above, in which R means $C_mH_{2m+1}$ or $C_mH_{2m+1}O$ in which m is an integer of 1-20, and the former is preferably hexyl, heptyl, octyl, nonyl, decyl, undecyl, dodecyl, tridecyl, tetradecyl, pentadecyl or hexadecyl;

X means preferably —$CH_2O$—, —$CH_2CH_2O$—, —$CH_2CH_2CH_2O$—, —$OCH_2$, —$OCH_2CH_2$— or —$OCH_2CH_2CH_2$—; and R* means

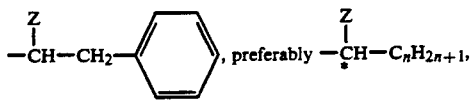

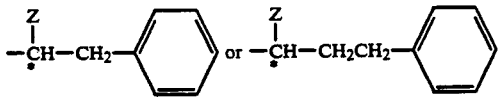

in which n is an integral of 1-20 and the $C_nH_{2n+1}$ part in the first is preferably butyl, isobutyl, pentyl, hexyl, heptyl, octyl, nonyl, decyl, undecyl, dodecyl, tridecyl and tetradecyl, and in which Z means preferably $CH_2F$, $CHF_2$, $CH_3$, $C_2F_5$, $CCl_3$, $CClF_2$, $CCl_2F$, $CHFCl$ or a perfluoroalkyl group of 3 or more carbon atoms as referred to above.

Particularly preferably liquid crystal compounds of the invention of the general formula given above are;

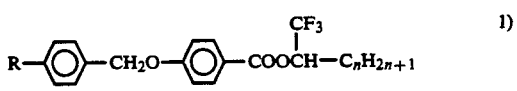 1)

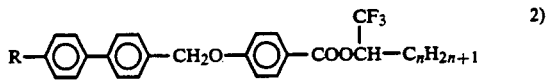 2)

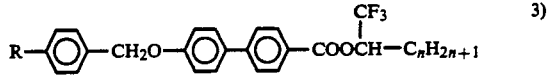 3)

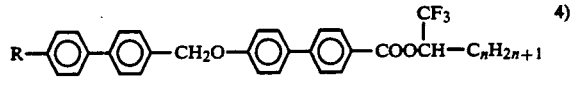 4)

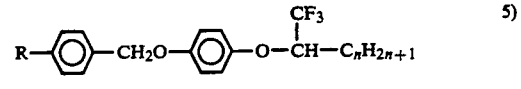 5)

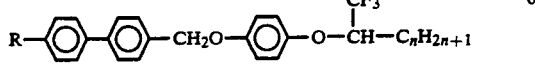 6)

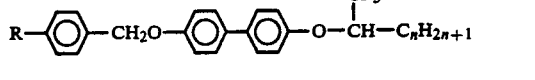 7)

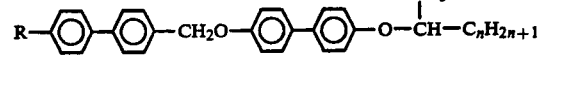 8)

in whic R means $C_mH_{2m+1}$ or $C_mH_{2m+1}O$; m and n are same or different with each other and mean an integral of 1-20 as referred to above, as well as the corresponding 8 compounds in which X means —$OCH_2$— instead of —$CH_2O$— as referred to above.

The objective compounds of the invention may be synthesized as shown by the reaction formulae as follows;

 (A)

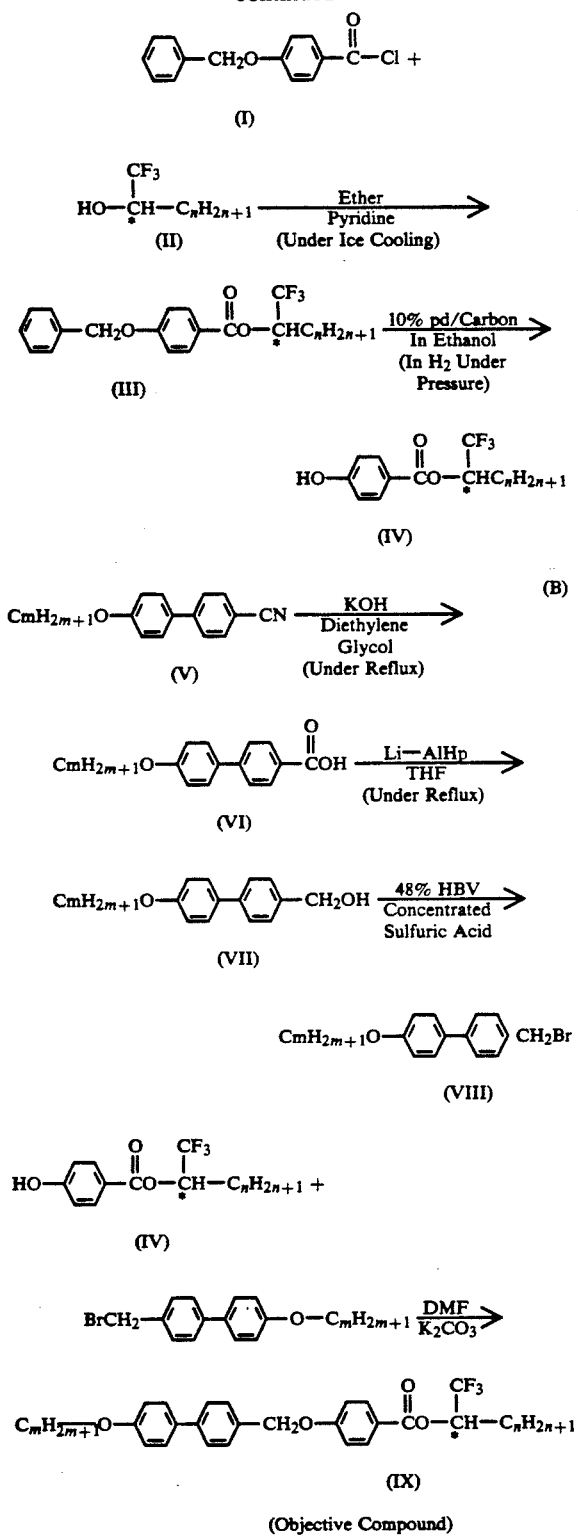

In the formulae, m and n may be same or different and respectively mean an intergrad of 1-20.

The novel compounds of the invention will be explained in more detail in reference to the following Examples. It is noted that the invention is of course not limited thereto.

EXAMPLE 1

(1) Synthesis of (+)-1,1,1-trifluoro-2-decyl-4-benzyloxybenzoate (III)

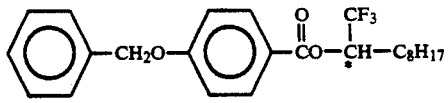

4-Benzyloxy-benzoic chloride in the amount of 20 g (81 m mol) was dissolved in 100 ml of methylene chloride to prepare a solution, to which 10 g (55m mol) of (+)-1,1,1-trifluoro-2-decanol (Optical purity 94% enanthiomer excess) in 6.4 g (81m mol) of pyridine was droppingly added under ice-cooling. The liquid mixture was subjected to the reaction at the room temperature for 2 hours, and washed successively with diluted hydrochloric acid, water, 1N aqueous solution of sodium carbonate and water. The organic phase was dried on anhydrous magnesium sulfate and subjecgted to distillation for removing the solvent so as to obtain the crude product, which was then subjected to the toluene/silica gel chromatography and the recrystallization with ethanol to obtain the above captioned compound (III) in the amount of 12 g.

(2) Synthesis of (+)-1,1,1-trifluoro-2-decyl-4-hydroxylbenzoate (IV)

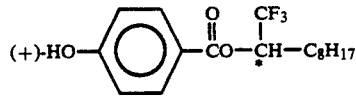

The compound obtained in the above (1) was dissolved in 100 ml of ethanol and added with 1.2 g of 10% Pd/carbon to be subjected to the hydrogenation reaction in hydrogen under pressure to obtain the above captioned compound (IV) in the amount of 9 g.

(3) Synthesis of 4'-octyloxy-4-bromomethylbiphenyl (VIII)

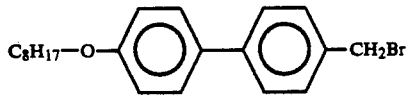

4'-Octyloxy-4-hydroxymethyl-biphenyl in the amount of 16 g, which was obtained by reducing 4'-octyloxy-4-biphenyl-carboxylic ethy;l in tetrahydrofuran as the solvent with hydrogenated lithium-aluminum, was added with 11 g of 48% hydrobromic acid and 53 g of concentrated sulfuric acid to be subjected to the reflux at a temperature of 100°-110° C. for 6 hours and then the extraction with toluene. The organic phase was washed with 1N hydrochloric acid and recrystallized with ethanol to obtain white crystal of the above captioned compound (VIII) in the amount of 13.5 g.

(4) Synthesis of (+)-1,1,1-trifluoro-2-decyl-4-(4'-octyloxybiphenyl-4''-methyleneoxy)benzoate (IX)

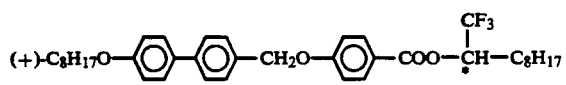

(+)-1,1,1-Trifluoro-2-decyl-4-hydroxybenzoate (IV) obtained in the above (2) in the amount of 9 g (30 m mol) and 4'-octyloxy-4-bromomethylbiphenyl (VIII) obtained in the above (3) in the amount of 13.5 g (36 m mol) were dissolved together with 5 g of potassium carbonate in 70 ml of dimethylformamide to be subjected to the reaction at a temperature of 110° C. for 2 hours. After the reaction liquid mixture was added with methylene chloride for the extraction, the organic phase was washed with 1N hydrochloric acid, dried over anhydrous magnesium sulfate and subjected to the distillation for removing the solvent. The crude product was subjected to the toluene/silica gel chromatography to obtain the objective compound (IX) in the amount of 5.3 g.

The infrared absorption spectrum (KBr) of the compound (IX) is shown in FIG. 1.

This compound is a liquid crystal showing the tristable phase and the phase transition points thereof are as follows as a result of observation by a polarizing microsope with a hot stage.

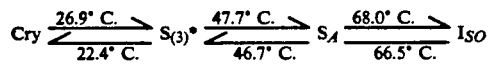

The Symbol, Sc*(3) shows the tristable liquid crystal phase.

Example 2

A glass substrate having transparent electrodes formed with indium/tin oxide was coated with polyimide layer according to the spin coating method and rubbing-treated in the unidirection. Two sheets of the glass substrates as above are laid one top on another via a spacer therebetween in such a way as the rubbing directions are parallel with each other to form a cell casing of 3.0 μm thickness.

The liquid crystal compound obtained in Example 1 was filled in the above casing in the isotropic phase to form a liquid crystal cell, which was set in a polarizing microscope with a photomultiplier having two deflecting plates arranged at a right angle to each other in such a way that the polarizer makes an angle of 22.5° to the molecule apsis direction when impressing no voltage.

Figure 2:
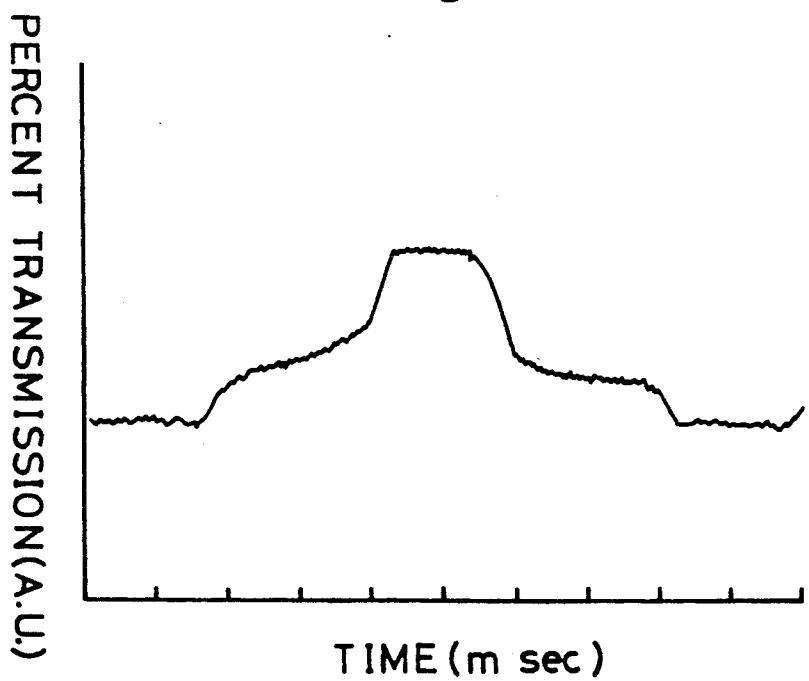
FIG. 2 shows an optical response wave form of the compound referred to the above in the $S_c(3)$ phase and FIG. 3 shows an optical response wave form of the compound referred to above according to the electroclinic effect in the $S_A$ phase.

The liquid crystal cell was gradually cooled by a temperature gradient of 0.1°-1.0° C./min. so that the liquid crystal was oriented at the S$_A$ phase and further gradually cooled. When triangular wave voltage of ±30 V, 10 Hz was impressed, the percent transmission is changed to be in the three states, i.e. the dark state in case where the impressed voltage is minus, the intermediate state in case of zero volt and the bright state in case of the plus voltage at the temperature range of 46.7° C.-22.4° C. It was observed that polarization inversion current wave peaks appear corresponding to the above change as shown in FIG. 2, according to which it can be confirmed that there are three stable molecular orientations, S*(3) of the liquid crystal, which are quite different from the conventional bistable smectic phase.

Example 3

Figure 3:
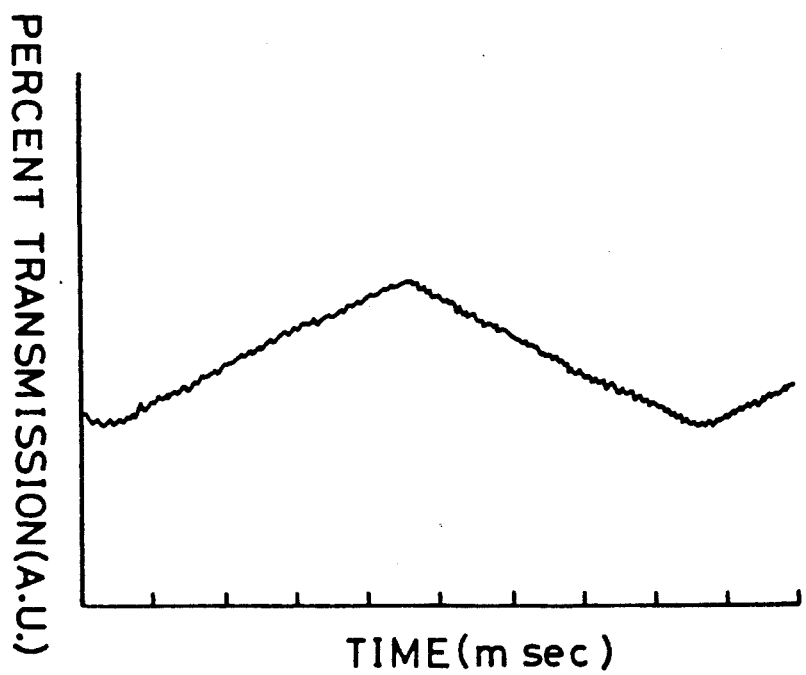

Similarly prepared liquid crystal cell was similarly treated to inspect the electrooptical response thereof by impressing triangular wave voltage of +30 V, 10 Hz, an electroclinic effect to be utilized for optical switching was observed so that the cell optical responses to the impressed voltage in the smectic A phase as shown in FIG. 3.

What is claimed is:

1. A liquid crystal compound represented by formula (I):

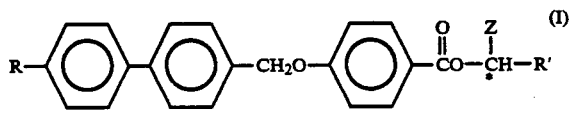

wherein R represents an alkyl or alkoxy group having 1-20 carbon atoms, R' represents an alkyl group of 1-20 carbon atoms and Z represents CF$_3$, CHF$_2$, CH$_2$F, CClF$_2$, CCl$_2$F, CHClF, CCl$_3$ or C$_2$F$_5$.

2. A liquid crystal compound as set forth in claim 1, wherein Z represent CF$_3$ or C$_2$F$_5$, and which exhibits an optically tristable state when in an S*(3) phase.

3. The liquid crystal compound as set forth in claim 1 wherein the

moiety is derived from an alcohol selected from the group consisting of 1,1,1-trifluoro-2-C$_6$-C$_{16}$ alkanol, 1,1-difluoro-2-C$_6$-C$_{16}$ alkanol, 1-monofluoro-2-C$_6$-C$_{16}$ alkanol, 1,1,1,2,2-pentafluoro-3-C$_6$-C$_{16}$ alkanol, 1-monofluoro-1,1-dichloro-2-C$_6$-C$_{16}$ alkanol, 1,1,1-trichloro-2-C$_6$-C$_{16}$ alkanol, 1,1-difluoro-1-monochloro-2-C$_6$-C$_{16}$ alkanol, 1,1,1-trifluoro-methyl-1-phenylmethanol, 1,1,1-trifluoro-methyl-2-phenylethanol, 1,1,1-trifluoro-methyl-3-phenylpropanol, 1,1,1-trifluoro-3-decene-2-ol and 1,1,1-trifluoro-3-heptine-2-ol.

4. The liquid crystal compound as set forth in claim 1, which is (+)-1,1,1-trifluoro-2-decyl-4-(4'-octyloxybiphenyl-4''-methyleneoxy)benzoate represented by

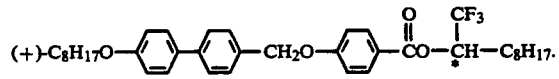

5. The liquid crystal compound as set forth in claim 1, which is (+)-1,1,1-trifluoro-2-decyl-4-(4'-octloxybiphenyl-4''-methyleneoxy)benzoate showing a liquid crystal phase of tristable state and having an optical response according to an electroclinic effect.

* * * * *